United States Patent [19]

Sparks et al.

[11] Patent Number: 5,694,558
[45] Date of Patent: Dec. 2, 1997

[54] METHOD AND SYSTEM FOR INTERACTIVE OBJECT-ORIENTED DIALOGUE MANAGEMENT

[75] Inventors: Randall B. Sparks, Louisville; Lori Meiskey, Broomfield; Hans Brunner, Denver, all of Colo.

[73] Assignee: U S West Technologies, Inc., Boulder, Colo.

[21] Appl. No.: 682,396

[22] Filed: Jul. 17, 1996

Related U.S. Application Data

[63] Continuation of Ser. No. 231,414, Apr. 22, 1994, abandoned.

[51] Int. Cl.$^6$ .................... G06F 3/00; G06F 3/16
[52] U.S. Cl. .................... 395/326; 395/759; 395/978; 395/357; 395/12
[58] Field of Search .................... 395/326, 978, 395/357, 356, 339, 759, 12, 62, 2.84, 2.79; 379/201

[56] References Cited

U.S. PATENT DOCUMENTS

| | | | |
|---|---|---|---|
| 4,785,408 | 11/1988 | Britton et al. | 395/2.79 |
| 5,255,305 | 10/1993 | Sattar | 379/201 X |
| 5,583,982 | 12/1996 | Matheny et al. | 395/326 |
| 5,594,642 | 1/1997 | Collins et al. | 395/12 X |

OTHER PUBLICATIONS

The Handbook of Artificial Intelligence, vol. 1, Barr et al., Addison–Wesley Pub. Co. 1981, pp. 281–291.

IEE Colloq. (1989) No. 135, User Interface Management Systems, Gray, "Interactive User Interface Design: the Chimera UIMS", pp. 6/1–6/5.

GLOBECOM'90; IEEE Global Telecommunications Conf., Muller et al, "Voice Interfaces to Information & Help Resources Toward an Intelligent Conversational Model" pp. 4083.1–4083.3.4.

Computer Software and Applications Conf. 1992 COMPSAC, Six et al., "A Software Engineering Perspective to the Design of a User Interface Framework", pp. 128–134.

IEE Colloq. (1989) No. 135: User Interface Management Systems, Patel, "Open Dialogue" pp. 4/1–4/6.

*Primary Examiner*—Raymond J. Bayerl
*Attorney, Agent, or Firm*—Brooks & Kushman P.C.

[57] ABSTRACT

A method and system for processing a user dialogue using dialogue-state objects. The method and system are implemented using an interactive computer system. The interactive computer system includes a dialogue manager and application control logic. The method includes the step of providing a plurality of objects encapsulating dialogue data and dialogue procedures associated with dialogue-states. The method next includes the step of providing a pointer. The pointer identifies a first object as a current object. The method further includes the step of receiving an input signal. The method also includes the step of processing the input signal. The method finally includes the step of updating the pointer based on the step of processing such that the pointer identifies a second object as the current object.

12 Claims, 3 Drawing Sheets

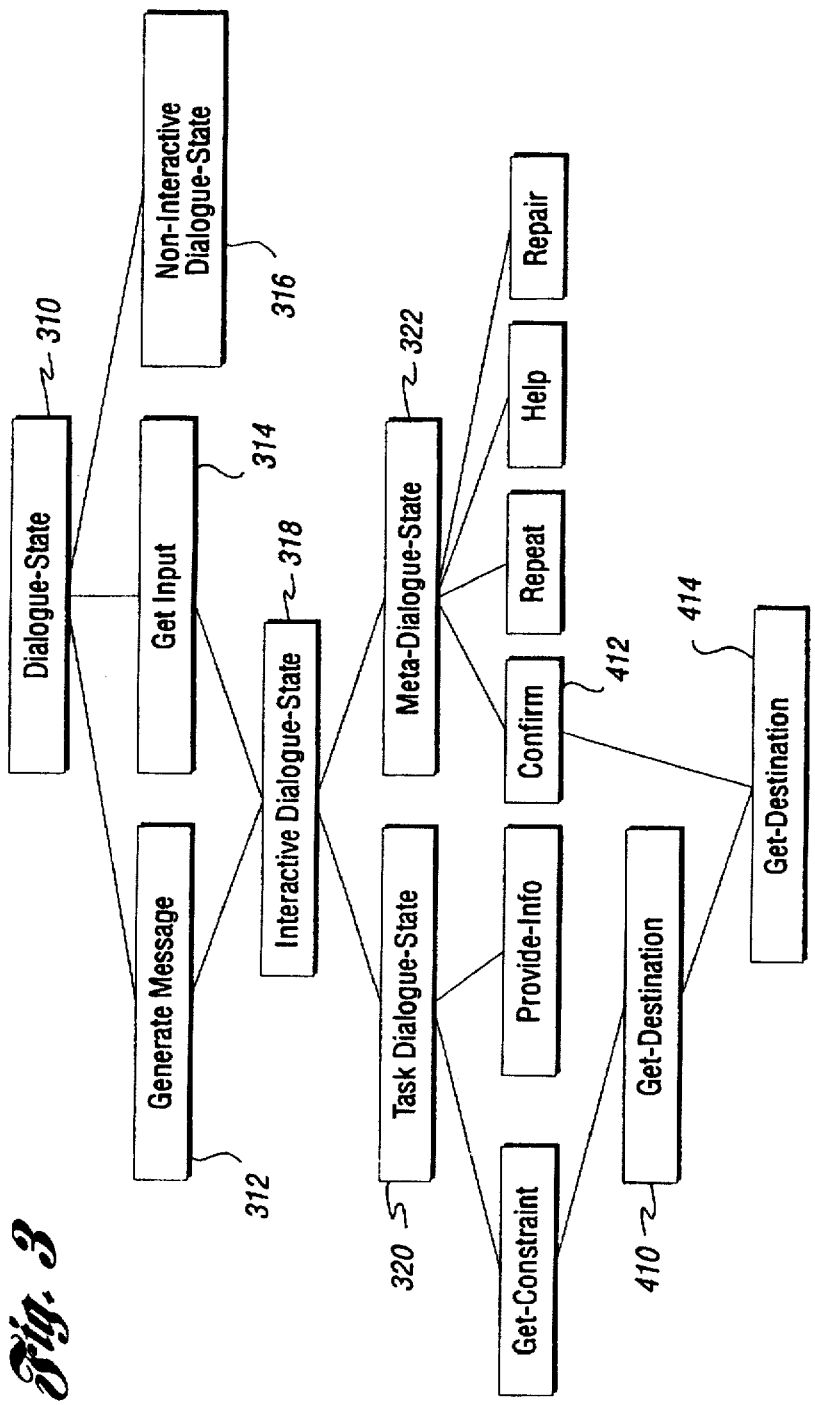
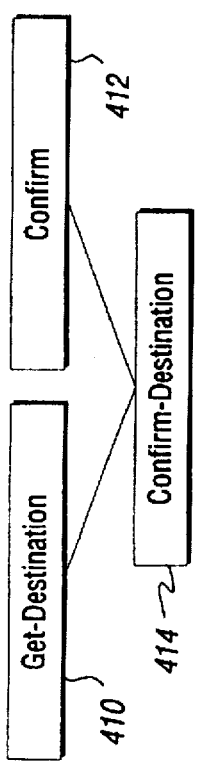

METHOD AND SYSTEM FOR INTERACTIVE OBJECT-ORIENTED DIALOGUE MANAGEMENT

This is a continuation of application Ser. No. 08/231,414 filed on Apr. 22, 1994, now abandoned.

TECHNICAL FIELD

This invention relates generally to controlling a user interface in an interactive computer system. In particular, this invention relates to methods and systems for processing a user dialogue using dialogue-state objects.

BACKGROUND ART

Object-oriented programming ("OOP") has existed since the early 1970's. In the early 1990's, object-oriented programming gained widespread acceptance due to increased power of workstations, proliferation of graphical user-interfaces ("GUI") and the development of hybrid object-oriented languages such as C++.

The OOP paradigm provides a class construct which combines data and procedural abstractions. A class definition includes a definition of the storage requirements of the class as well as the procedures which define how objects of the class behave.

An object is an instance of a class. Every object includes the data and procedural characteristics of its class. In addition, new objects inherit the storage and functionality defined by all classes used to define the parents of the object.

Using an OOP approach, software engineers decompose a problem into objects which mimic the real world. A typical example of an object-oriented solution is a graphical user-interface which may include such objects as icons, cursors, dialog boxes and windows. The objects of such GUIs act as tools to facilitate the data collection. Some applications require limited data collection while other applications require extended interactive data collection referred to as a dialogue.

In relatively simple interactive systems, explicit dialogue management is generally not necessary. The interaction between a user and a simple interactive system is determined by a fixed sequence of sub-tasks or a fixed set of paths through a simple tree-like structure of actions. Menu-based systems fall into the category of simple interactive systems. In such systems, the user chooses from a fixed list of tasks and cannot work on several tasks simultaneously.

A dialogue-based system is most appropriate in cases where use of high information bandwidth visual displays is impractical and the tasks of query specification and/or delivery of the retrieved information are complex enough to make the use of simple command-based or menu-based techniques cumbersome or unworkable.

In complex information domains, either the information itself or the user's task may be complex. Information may be complex due to a large volume or due to complex relationships between components of the information. A travel itinerary, for example, may be complex due to the time dependencies among airline, taxi dinner and hotel reservations.

A user's task in utilizing an information service may be complex due to the many steps or sub-tasks involved. A user's task may be further complicated by embedded sub-tasks or dependencies among sub-tasks.

In complex information domains, careful management of a system's interaction with the user is both difficult and crucial for successful interaction. Such situations call for a more sophisticated approach to the management of the dialogue. In these situations, explicit dialogue management can provide for flexible interactions in which the system:

gives the user guidance as needed, allows the user to take the initiative and alter the course of the dialogue, recovers gracefully when problems arise, getting the user back on track to accomplish the task at hand.

Dialogue management is typically required for an information service. An information service generally involves finding and delivering information to a user or assisting the user with an information-dependent task.

DISCLOSURE OF THE INVENTION

A need therefore exists for a method and system for managing more sophisticated dialogues between a user and an application. More particularly, a need exists for a dialogue manager which supports user interaction in complex information domains and can be used in many different applications.

The present invention described and disclosed herein comprises a method and system for an interactive object-oriented dialogue manager.

It is an object of the present invention to provide a method and system for managing an interactive dialogue between a user and an application using dialogue-states.

It is another object of the present invention to provide a method and system for managing an interactive dialogue between a user and an application using object-oriented programming techniques.

It is yet another object of the present invention to provide a method and system for managing an interactive dialogue between a user and an application which can be used by many different applications.

In carrying out the above objects and other objects of the present invention, a method is provided for processing a dialogue between a user and an application in an interactive computer system. The interactive computer system includes a dialogue manager and application control logic.

The method begins with the step of providing a plurality of objects. Each object encapsulates dialogue data and dialogue procedures associated with a dialogue-state.

The method continues with the step of providing a pointer to identify a first object as a current object. Next, the method includes the step of receiving an input signal. Typically, the signal represents a user request or user information.

The method also includes the step of processing input signal. Finally, the method concludes with the step of updating the pointer to identify a second object as the current object. The step of updating is based on the step of processing.

In further carrying out the above objects and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 3 is a diagram illustrating a partial dialogue-state inheritance hierarchy;

FIG. 4 is a diagram illustrating a specific example of dialogue-state inheritance.

BEST MODES FOR CARRYING OUT THE INVENTION

Figure 1:
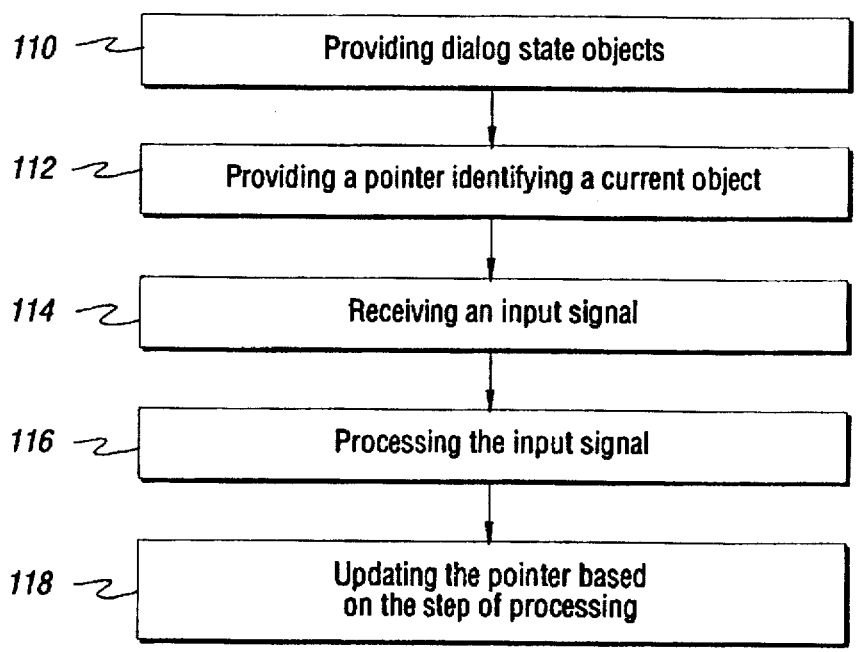
FIG. 1 is a flow chart illustrating the method of the present invention.

Referring now to the drawings, FIG. 1 illustrates the method of the present invention.

The method of the present invention begins with the step of providing a plurality of dialogue-state objects as shown by block 110. Next, block 112 illustrates the second step of the method, providing a pointer.

The pointer identifies a first object as a current object. The dialogue-state associated with the current object is known as the current dialogue-state.

As shown by block 114, the method next includes the step of receiving an input signal. Block 116 illustrates the step of processing the filtered and sorted input signal. Finally, the method includes the step of updating the pointer to identify a second object as the current object based on the step of processing, as shown by block 118.

A Dialogue-Based System For Automobile Navigation

Figure 2:
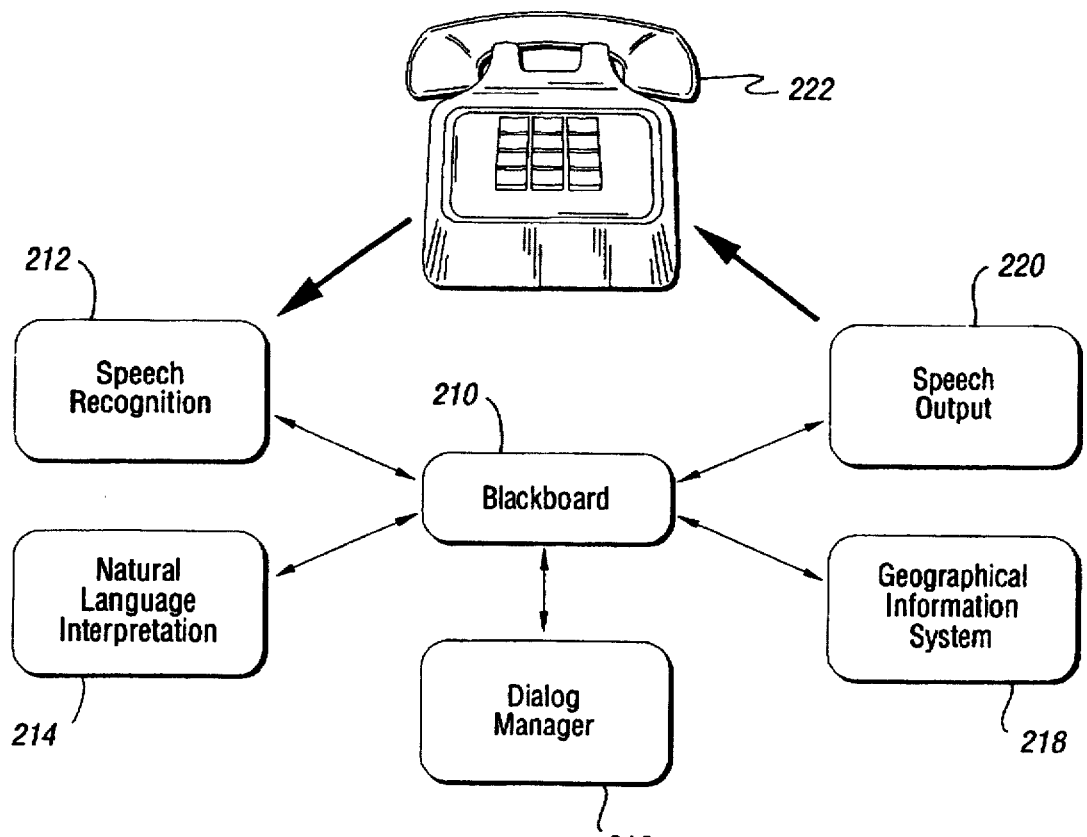
FIG. 2 is a functional block diagram illustrating one environment of the present invention.

In order to facilitate a complete appreciation of the present invention, it will be described in connection with a Voice Navigation System ("VNS"). The VNS is a prototype of a dialogue-based information service for accessing relatively complex information over the telephone. The prototype system provides users with directions for driving between locations within the Denver metropolitan area. The basic architecture of the VNS is shown in FIG. 2.

Automobile navigation is an appropriate domain for such a dialogue management system because it involves an intermediate level of complexity in both information content and user interaction. In this domain, information content is potentially complex because of the large number of objects and object types in the domain. Objects include streets, addresses, landmarks, intersections, distances, turns and compass directions. Information content is also complex because routes vary widely in their length and complexity, and because the information to be delivered to the user, namely the route, must be divided into appropriate segments in order to be given to the user in spoken form.

User interaction is potentially complex because both the specification of queries and the delivery of information may require multiple, interactively controlled steps. Additional complexity is added to the interaction because the user is provided the flexibility to pursue these steps in different orders. The user may also provide multiple inputs at one time, request repetitions and clarifications, or start over at any point in the dialogue.

The VNS operates through system-internal communication among its components. A central blackboard 210 manages the communication among a speech recognition module 212, a natural language interpretation module 214, a dialogue manager 216, a geographical information system ("GIS") 218, and a speech output module 220. A particular component is notified when data becomes available on the blackboard that is of an appropriate type for processing by that component.

Inputs to the dialogue manager come from three sources. The first input is an "off-hook" signal from a telephone interface 222 which signals the beginning of a new call. The second input is an interpretation of user inputs from the natural language interpretation module 214. The third input is output from the GIS 218, the database and route planning component of the system.

Outputs that the dialogue manager 216 posts to the blackboard 210 are also of three types: (1) indications of the current dialogue-state, (2) output messages to be presented to the user, and (3) routing queries to be submitted to the GIS 218.

The Dialogue Manager

When a user calls the system, the dialogue manager 216 initiates the dialogue with a simple welcome message and prompts the user for his or her I.D. number. The user may respond with an I.D. number or in some other way, such as requesting help or supplying other information, such as a destination in addition to an I.D.

If the input is not understood, the system will re-prompt the user for an I.D. If the input is understood and contains an I.D., the dialogue manager 216 will validate the I.D. If it is invalid, the user will be informed of this and re-prompted. If the I.D. is valid, the dialogue manager 216 will process any other inputs that accompanied it; otherwise it will proceed to prompt the user for the next piece of information needed.

The dialogue then continues in a similar fashion: the system guides the user through the dialogue by prompting for the information it needs to accomplish the task of providing the user with directions. The dialogue manager 216 responds flexibly to the user's input actions, allowing for single or multiple inputs during one turn and for inputs to be presented in different orders.

For example, an experienced user may simply provide all of the information needed—I.D. number, starting location and destination—at the first opportunity. These may also be presented in any order. Less experienced users, however, are more likely to follow a step-by-step approach.

Users may also request help regarding how to proceed at any point or ask for previous output to be repeated. Once all the information required to determine a route has been gathered, the dialogue manager 216 formulates a query, submits it to the GIS 218 and receives the resulting route. Next, the route returned from the GIS 218 is transformed into an English form appropriate for spoken output and segmented into appropriate steps by the speech output module 226. The route is presented to the user interactively, with the user in control of when the next step in the directions is presented. The user may request a repetition of all or part of the directions, or end the call at any time.

The interaction is designed to be focused yet flexible, so the user can complete the task efficiently, while allowing for different levels of experience and different contexts of use among users. In particular, the system is designed to be convenient whether a user is accessing the system before beginning a journey or calling from a cellular phone while underway. The tasks the dialogue manager 216 executes during a typical interaction with the user are summarized below:

(1) Receive inputs from the Blackboard.
An "Off-Hook" message from the telephone interface component.

Interpreted user inputs from the natural language component.

Routes returned from the GIS.

(2) Filter and sort inputs.

(3) Process each input.
Fill query constraints from user input.
Construct & submit route query to GIS.
Chunk GIS route into steps for output to user.
Generate response or next prompt.

(4) Keep track of tasks now finished and tasks remaining to be done.

(5) Return to the blackboard.
A new Dialogue-state.
Output Messages for User.
A GIS Query.

Referring now to FIG. 3, there is illustrated a partial dialogue-state inheritance hierarchy. This dialogue-state inheritance hierarchy was formulated prior to constructing the prototype VNS.

It was determined that the overall task of providing the user directions could be divided into five sub-tasks: (1) Welcome, (2) Get-Query-Constraints, (3) Determine-Route, (4) Provide-Directions, and (5) Good-bye. These, in turn, could be divided into further sets of sub-tasks.

For example, the Get-Query-Constraints task was composed of sub-tasks for determining whether the user was continuing on a previously established route, for getting the current or starting location, and for getting the destination. In addition to this hierarchical structure, consistent patterns of shared properties among the different types of sub-dialogues were identified. For example, some sub-dialogues involved primarily soliciting information from the user while others involved primarily providing output.

These two properties of the sub-dialogues, hierarchical structure and the sharing of common properties, permit this type of dialogue to be modeled using an object-oriented approach. In this approach, the contexts in which sub-dialogues take place are modeled as abstract objects, called dialogue-states. These states are organized into an hierarchy of dialogue-state classes. A portion of this hierarchy is shown in FIG. 3.

Each instance of a state belongs to one or more classes, from which it inherits its particular set of properties and behaviors. The states highest in the hierarchy address the most general sub-tasks; those below them address more specific sub-tasks.

At the root of the hierarchy is the base Dialogue-State Class 310, from which all dialogue-states inherit. At the next level is the Generate-Message Class 312, the Get-Input Class 314, and the Non-Interactive Class 316.

The Generate-Message Class 312 defines the behavior needed to generate prompts or other information to be presented to the user. All dialogue-states that produce output inherit from this class.

The Get-Input Class 314 defines methods for receiving and responding to inputs from the user, such as sorting multiple inputs or filing query constraints with information contained in the input. All states that accept input from the user inherit from the Get-Input Class 314.

The non-interactive dialogue-state Class 318 is used for system-internal operations. These include formulating and submitting a query to the GIS 118.

The Interactive Dialogue-State Class 318 inherits from both the Generate-Message Class 312 and Get-Input Class 314. It defines the behaviors for dialogue-states that both accept input from the user and generate output. These are of two types: task dialogue-states 320 and meta-dialogue-states 322.

Task dialogue-states 320 implement the main task-oriented activities of opening and closing the dialogue, obtaining query constraints from the user, and providing output. Meta-dialogue-states 322 define methods for providing help, confirming inputs, repeating outputs, and repairing misunderstanding or resolving other problems in the dialogue. Meta-dialogue-states 322, for example, can be useful when user-supplied information turns out to be invalid, such as when a particular street address does not exist.

As an example of the use of inheritance, FIG. 4 shows how the Confirm-Destination dialogue-state 414 inherits from its parent states Get-Destination 410 and Confirm 412. The Confirm-Destination state 414 would be active in the following example exchange:

User: I need to get to the airport.

System: Please confirm your destination as Stapleton Airport.

User: Yes, and I'm starting from the Embassy Suites Hotel.

From the Confirm 412, the Confirm-Destination state 414 inherits methods for handling confirmations (yes/no inputs), expectations for a yes/no type of response, and help information appropriate for confirmation states. From Get-Destination 410, it inherits rules for handling location inputs, expectations that locations will be input and that words or phrases such as "now at" or "starting from" may be included to differentiate starting locations from destinations, and help information pertinent to determining destinations.

By inheriting from both these parent dialogue-states, Confirm-Destination 414 can handle with both types of inputs. Organizing the dialogue-states into an inheritance hierarchy allows characteristics shared among states to be defined more succinctly. Portability is enhanced through the reuse of the domain-independent dialogue-state classes that appear near the base of the inheritance hierarchy. For example, the dialogue-states Welcome, Get-Constraints, Retrieve-Information, Provide-Output, and Good-bye could be used for dialogue-based systems in many new domains.

In the course of a user-application dialogue, instances of dialogue-states are created as needed, according to a default dialogue plan and the current context of the dialogue (i.e. what has been done so far and what remains to be done).

A dialogue-state inherits from its parent classes certain properties and behaviors. Examples of inherited properties include the following:

The sub-task to be performed.

Satisfaction conditions for determining when the state may be considered complete.

What types of meta-dialogues may be scheduled for this dialogue-state and under what conditions (for example, a confirmation threshold to determine whether or not to confirm user input in this state).

Expectations about the types of user input that may occur during this dialogue-state.

Prompts or other information that can be provided to the user, such as currently relevant help information.

Examples of inherited behaviors include:

The ability to output a message to the user (to prompt for input or supply output).

The ability to accept input from the user to be processed.

The ability to respond to the user after input is processed.

Procedures for sorting and pruning inputs.

The ability to store user-supplied information for use in constructing a query.

The ability to schedule needed sub-dialogue-states or to make transitions to new primary dialogue-states.

Generally, properties are inherited in the form of slots for storing information in the dialogue-states. Behaviors are inherited in the form of methods. Methods implement the dialogue management rules that define the behavior of the system as a whole.

Rules are invoked whenever a user has provided some input to the system. Which rule is applied at a given point in a dialogue depends on: (1) the type of user input received, and (2) the current dialogue-state. For every dialogue-state there is a set of rules, one for each possible type of input.

The types of user inputs correspond to the different actions users may take or the sorts of information that users may provide. Examples of actions users may take are: requesting help, asking the system to go on to the next step in the directions or to repeat its last output, or providing information to the system, such as an I.D. number or current location. When the action involves supplying information to the system, the information belongs to one of several types, such as an I.D. number, a location (which may be one of several subtypes, such as intersection, address, landmark, etc.) or a "yes" or "no" response to a question from the system.

The Dialogue Plan

Figure 5:
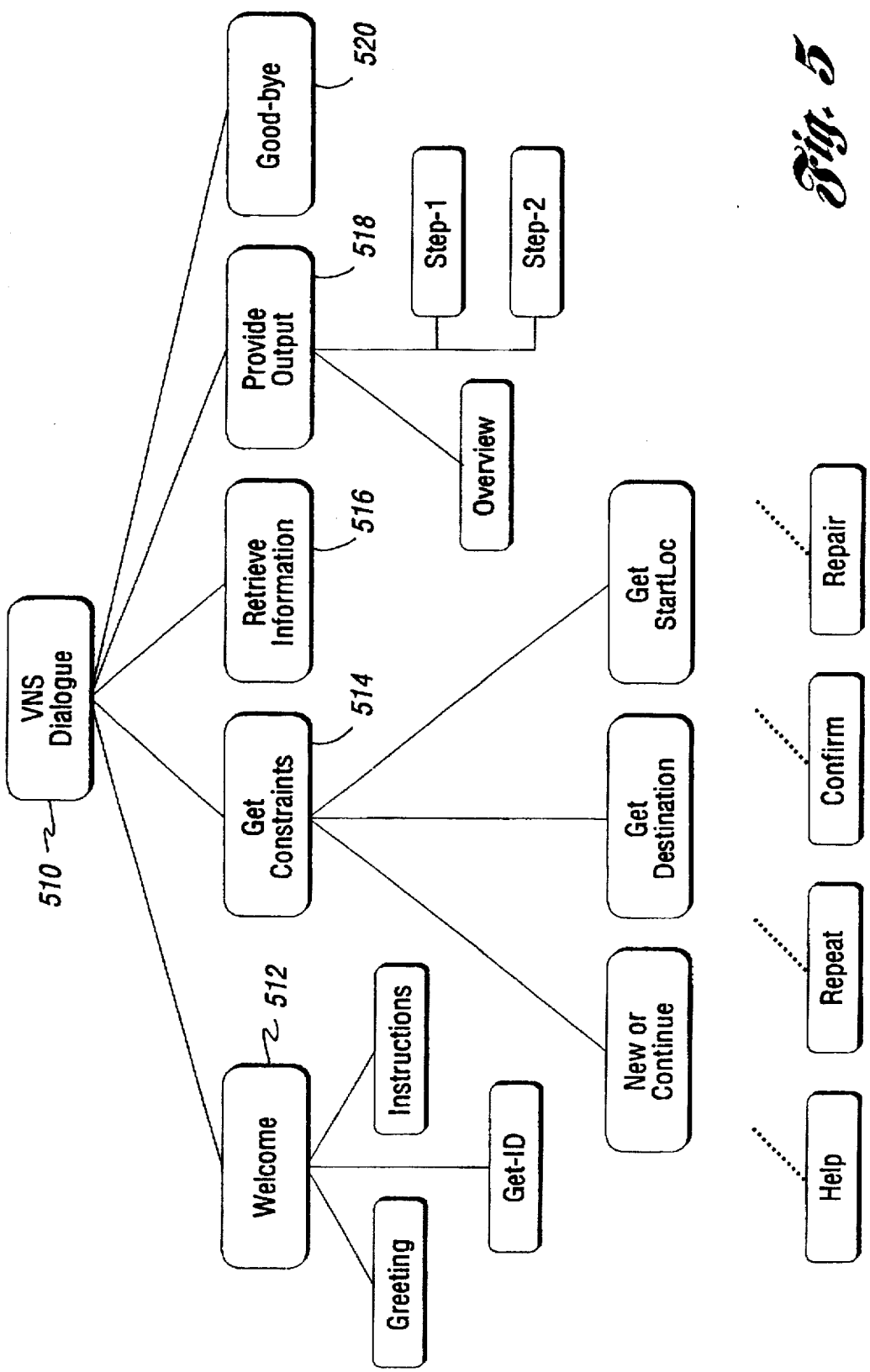
FIG. 5 is a diagram illustrating the dialogue-states of a default dialogue plan.

Sequential ordering among dialogue-states is represented in the default dialogue plan, shown in FIG. 5. In some cases, states must have a specific order. In other cases, there is no strict ordering that must be followed. Where no particular order is required, there may be a preferred order. The user, however, may alter this order by offering an input which is out of the preferred sequence. The default dialogue plan organizes the interactions with the user in ways that correspond to the dialogue structures found to be successful for accomplishing the navigation task.

In the VNS, the dialogue plan is implemented as a tree structure. Each node in the plan represents a task or sub-task. At the top level of the plan is a node representing the primary goal of completing an information-providing dialogue with the user.

As shown in FIG. 5, VNS dialogue 510 is the root node of the tree. Below this are dialogue-states for the sub-tasks needed to complete the primary task: Welcome 512, Get-Constraints 514, Retrieve-Information 516, Provide-Output 518, and Good-bye 520. Similarly, the Welcome task 512 is carried out by three sub-tasks. The first sub-task, of greeting the user, performs the functions of answering the phone and saying "hello". The second sub-task of the Welcome 512 is getting the user's I.D. The third sub-task involves providing some basic instructions on how to proceed.

The sub-tasks in the dialogue plan up to this point are essentially domain-independent. That is, they are applicable to spoken dialogue-based information access in general.

Lower in the dialogue plan tree, the sub-tasks become more specific and domain-dependent. For example, to complete the Get-Constraints task 514 in the navigation domain, the system must complete the Get-Destination and Get-Start-Location sub-tasks.

At the bottom of FIG. 5, several meta-dialogue-states are shown. These include both domain-independent and domain-dependent features. They are not attached to the default dialogue plan, but can be attached at any point in a dialogue as required.

During interaction with a user, the dialogue manager 216 uses the dialogue plan as a default schedule of actions to undertake. That is, a dialogue is begun with a welcome to the user, after which the system prompts the user for an I.D. If the I.D. is valid, the Get-Constraints section of the plan is entered, beginning with Get-Destination, then Get-Start-Location. The dialogue manager 216 continues to follow the default plan unless the user chooses to deviate from it by requesting help or a repetition, or by providing multiple inputs or inputs that have not yet been prompted for.

It is important to emphasize that the default dialogue plan is not a rigid specification of how an actual dialogue must proceed. Rather, it serves as a resource for the execution of an actual dialogue by providing a representation of the required sub-tasks and a default ordering among them. As a dialogue with the user unfolds, if the sub-task for a particular step in the plan has already been performed, that step can be skipped.

For example, if the user provides both a destination and a starting location during the Get-Destination sub-task, then the Get-Start-Location sub-task can be skipped. If a destination can be determined with a high degree of reliability during the Get-Destination step, the Confirm-Destination step may be skipped. This is the case, for example, if the destination can be retrieved from a record of the user's last call (in cases where the user is continuing to the same destination) or where the confidence score for recognition and understanding of the user's input is sufficiently high.

Meta-dialogues are scheduled dynamically, as the need arises, thus modifying or extending the dialogue plan for use in a particular dialogue. If the dialogue manager 216 determines that a particular user input should be confirmed, a confirmation meta-dialogue is scheduled. The dialogue manager may require confirmation if the recognition score for the input was low or misrecognition of this type of information would have relatively serious consequences. Similarly, if the user requests help or a repetition, the appropriate meta-dialogues are scheduled.

To summarize, the dialogue manager 216 includes a set of dialogue-states, each of which is designed to perform a particular sub-task. There are both hierarchical and sequential relationships among these states. Some sub-tasks are required for completion of the primary task; others are optional, and are used only as the need arises.

The sequential relationships among states include both required orderings and preferred orderings. These relationships among dialogue-states are represented by a default dialogue plan and a dialogue-state inheritance hierarchy.

The dialogue plan primarily represents sequential relationships among states. It constitutes a default ordering among states, based on a model of a task-oriented dialogue. The inheritance hierarchy primarily represents hierarchical relationships among dialogue-state classes.

Object-Oriented Dialogue Management

An object-oriented method for the design of the dialogue management component of an information service has been described. The method has been used in the implementation of the dialogue manager for the Voice Navigation System, a system that provides driving directions interactively over the telephone.

Using the present method, dialogues consist of a sequence of dialogue-states, which are defined in an inheritance hierarchy and are instantiated as needed during an actual dialogue. A dialogue plan guides the sequence of states used during interaction with the user, although the user may alter the course of the dialogue by providing multiple inputs, out-of-order inputs, or by requesting a meta-dialogue.

Dialogue-states encapsulate the information and behavior needed to carry out the currently relevant sub-tasks in the dialogue. All user actions that are relevant in a given dialogue-state have corresponding methods to handle those input actions.

Although dialogue-states are abstract objects, they have proved to be an effective way of conceptualizing and organizing the structure of task-oriented design for the encapsulation of dialogue-state information and behavior. The use of a dialogue-state inheritance hierarchy has also made implementation of the system easier and more efficient.

Many of the dialogue-states, particularly the dialogue-states at the top of the hierarchy, are useful for the development of interfaces in other application domains. The object-oriented dialogue management method described herein is not limited to spoken language interfaces. Object-oriented dialogue management can be implemented with other types of applications and interfaces.

While the best mode for carrying out the invention has been described in detail, those familiar with the art to which this invention relates will recognize various alternative designs and embodiments for practicing the invention as defined by the following claims.

What is claimed is:

1. In an interactive computer system including a dialogue manager and application control logic, a method for processing a dialogue between a user and an application, wherein the dialogue consists of a plurality of sub-dialogues, the method comprising:

providing a plurality of objects, each object encapsulating dialogue data and dialogue procedures associated with a dialogue-state, each of the dialogue-states being a model of one of the plurality of sub-dialogues;

determining an inheritance hierarchy of the dialogue-states corresponding to dialogue situations between the user and the application;

providing a pointer to identify a first object as a current object corresponding to an initiation of the dialogue between the user and the application;

receiving an input signal from the user;

processing the input signal based on the dialogue-state corresponding to the current object; and updating the printer to identify a second object as the current object, the step of updating being based on the step of processing.

2. The method of claim 1 wherein the step of providing the plurality of objects includes the step of sequencing the plurality of objects to represent a default dialogue plan.

3. The method of claim 1 wherein the step of processing includes the steps of:

filtering the input signal to remove extraneous elements; and sorting the filtered input signal to order multiple elements.

4. The method of claim 1 wherein the plurality of objects includes a parent object and a child object and the child object includes at least one variable from the parent object.

5. The method of claim 1 wherein the plurality of objects includes a parent object and a child object and the child object includes at least one procedure from the parent object.

6. The method of claim 1 wherein the step of receiving an input signal further includes:

receiving spoken natural language information from the user; and translating the spoken natural language information into an input signal.

7. An interactive computer system including a dialogue manager and application control logic, the system for processing a dialogue between a user and an application, wherein the dialogue consists of a plurality of sub-dialogues, the system comprising:

means for providing a plurality of objects, each object encapsulating dialogue data and dialogue procedures associated with a dialogue-state, each of the dialogue-states being a model of one of the plurality of sub-dialogues;

means for determining an inheritance hierarchy of the dialogue-states corresponding to dialogue situations between the user and the application;

means for providing a pointer to identify a first object as a current object corresponding to an initiator of the dialogue between the user and the application;

means for receiving an input signal from the user;

means for processing the input signal based on the dialogue-state corresponding to the current object; and means for updating the pointer to identify a second object as the current object, the step of updating being based on the step of processing.

8. The system of claim 7 wherein the means for providing the plurality of objects includes means for sequencing the objects to represent a default dialogue plan.

9. The system of claim 7 wherein the means for processing further includes:

means for filtering the input signal to remove extraneous elements; and means for sorting the filtered input signal to order multiple elements.

10. The system of claim 7 wherein the plurality of objects includes a parent object and a child object and the child object includes at least one variable from the parent object.

11. The system of claim 7 wherein the plurality of objects includes a parent object and child second object and the child object includes at least one procedure from the parent object.

12. The system of claim 7 wherein the means for receiving an input signal further includes:

means for receiving spoken natural language information from the user; and means for translating the spoken natural language information into an input signal.

* * * * *